P. A. BAYLESS & C. F. REDMAN.
EGG SEPARATOR.
APPLICATION FILED APR. 24, 1909.
940,119.
Patented Nov. 16, 1909.
3 SHEETS—SHEET 2.
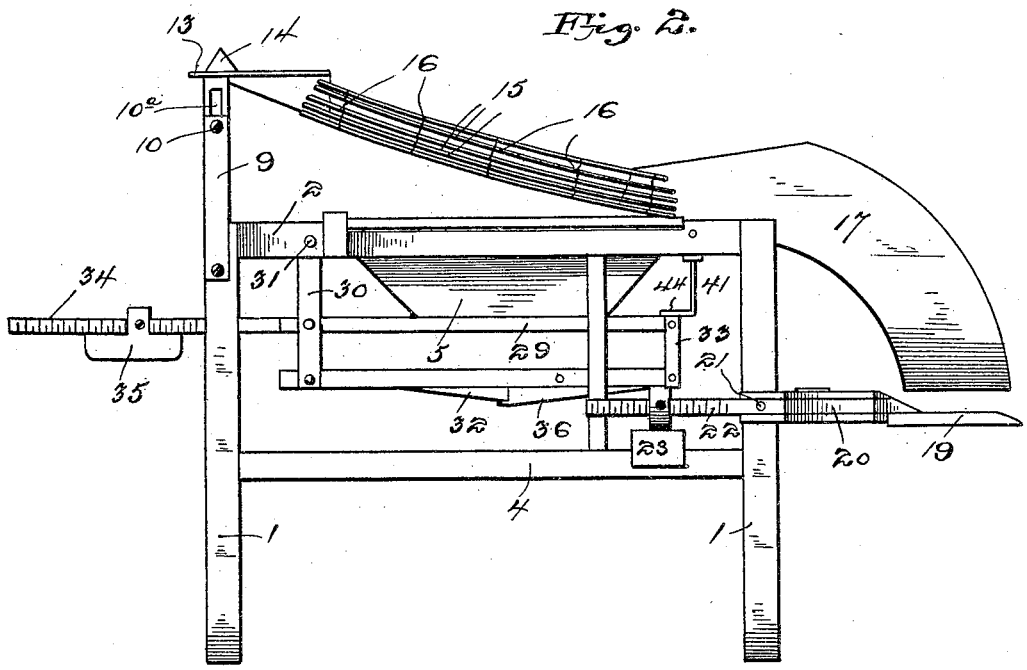
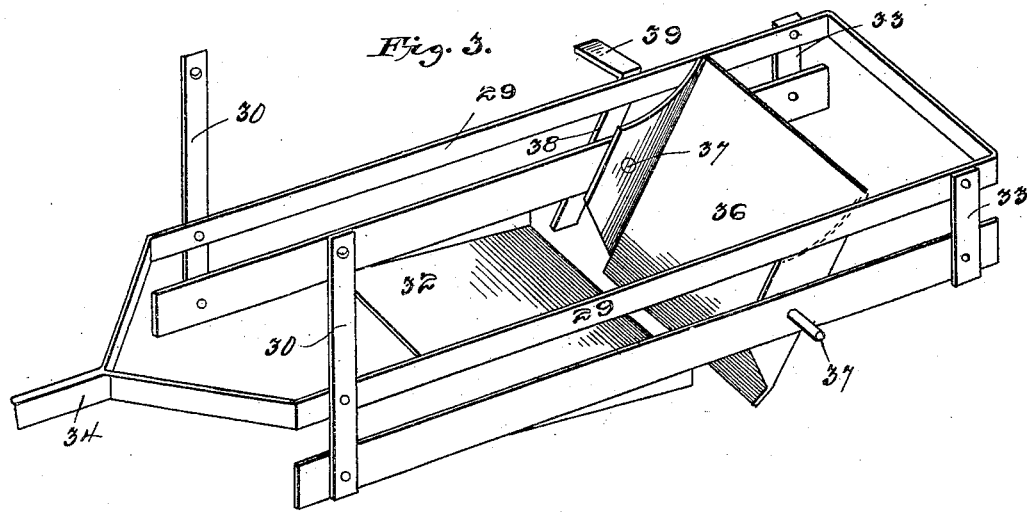
Witnesses
J. W. Wells
H. Garwood Doyle
Inventors
Patrick A. Bayless
and Charles F. Redman.
By E. E. Vrooman,
Attorney.

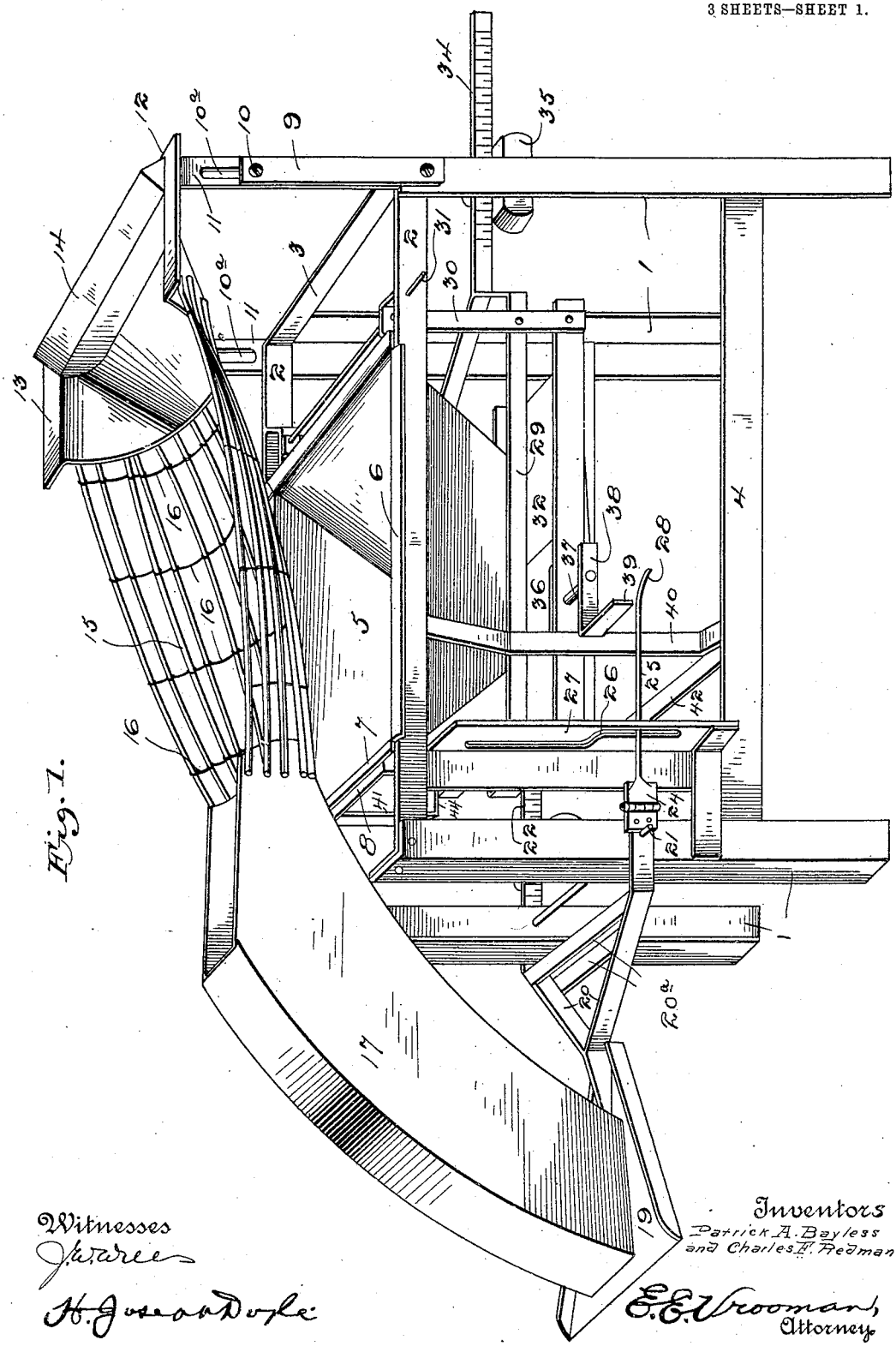

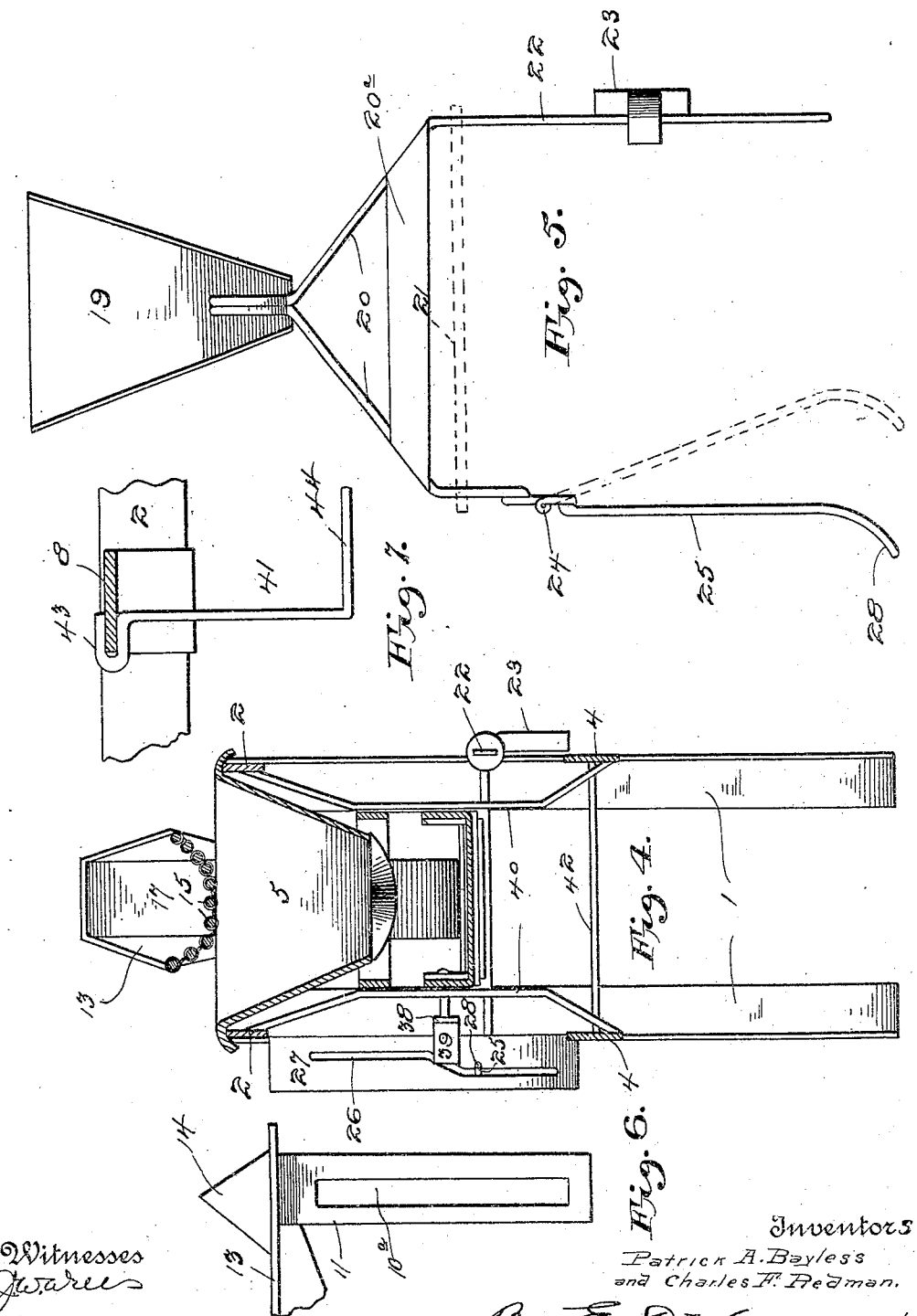

UNITED STATES PATENT OFFICE.

PATRICK A. BAYLESS AND CHARLES F. REDMAN, OF OKLAHOMA, OKLAHOMA.

EGG-SEPARATOR.

940,119.  Specification of Letters Patent.  Patented Nov. 16, 1909.

Application filed April 24, 1909. Serial No. 491,944.

*To all whom it may concern:*

Be it known that we, PATRICK A. BAYLESS and CHARLES F. REDMAN, citizens of the United States, residing at Oklahoma city, in the county of Oklahoma and State of Oklahoma, have invented certain new and useful Improvements in Egg-Separators, of which the following is a specification, reference being had therein to the accompanying drawing.

This invention relates to egg separators adapted for automatically separating the yolks from the whites, and has specially in view improved automatically acting mechanism whereby such separation will be quickly effected, and also means whereby a bad or defective egg may be separated from both the whites and yolks.

In carrying out the objects of the invention generally stated above the invention contemplates the employment of a novel type of adjustable chute upon which the eggs are broken and the contents thereof delivered to a screening portion of the chute which separates the yolks from the whites and permits the former to pass to a discharge nozzle and delivered to a pivotally mounted spoon which automatically drops the yolks to a suitable receptacle. At the same time, the whites drop through said screen and onto a receptacle provided with a counterweight which permits the same to be inclined to discharge its contents into a suitable receptacle. Said counterweighted receptacle or tray is also provided with a pivotally mounted end section which is rocked to an open position when the weight of an entire egg falls thereon, such for instance as when a bad egg falls through the chute or when the yolk of an egg is broken and caused to fall through said chute with the white, and delivers its contents into a third receptacle.

In carrying out the objects of the invention generally stated above it will, of course, be readily understood that the essential features of the same involved in carrying out the invention are necessarily susceptible to a wide range of details and structural arrangements, but one preferred and practical embodiment of the same is shown in the accompanying drawings, wherein—

Figure 1 is a perspective view of the improved egg separator. Fig. 2 is a side elevation thereof. Fig. 3 is a detail perspective view of the swinging tray which receives the whites and bad or defective eggs. Fig. 4 is a central horizontal sectional view taken on the line 4—4, Fig. 2. Fig. 5 is a detail plan view of the pivotally mounted spoon which receives the yolks of the eggs. Fig. 6 is a detail elevation of one of the supports for the separating trough. Fig. 7 is a detail elevation of a stop carried by the main frame for limiting the upward movement of the tray thereof.

Referring to the accompanying drawings by numerals, it will be observed that the improved egg separator comprises a supporting frame formed of four corner standards 1 which are vertically arranged and connected at their upper ends by means of the side members 2 and end member 3, said frame being also provided with the lower horizontally arranged side members 4 which connect the corner posts of each side. A hopper 5 provided with outturned side and end flanges 6 and 7 for engagement with the side members 2 and an intermediate cross member 8 hangs in a pendent position within the frame. The rear standards of the frame are provided with adjusting straps 9 which carry end screws 10 for slidable engagement with a slot $10^a$ formed in the sides 11 of a vertical end portion 12 of a chute frame 13. Said chute frame 13 at its adjustably connected end is provided with a transversely extending ridge 14 upon which eggs may be broken, and with a trough shaped chute formed of spaced apart rods 15 which are intersected by transversely arranged stripper wires 16. The lower end of said trough shaped chute communicates with a downwardly curved discharge nozzle 17 the outlet end of which is normally closed by means of a spoon 19 provided with rearwardly extending diverging legs 20 which are provided with reinforcing bars $20^a$ and mounted upon a shaft 21 extending transversely through the front standards of the frame. One of said legs 20 projects beyond its shaft 21 and terminates in a scale beam 22 having a counterweight 23 slidably mounted thereon. The other leg has a hinge connection 24 with a trip lever 25 which projects through a vertically arranged cam slot 26 formed in a plate or wing 27 carried by the said frame. The free end of said tripping lever is preferably outturned as indicated at 28.

A tray frame 29 has its rear end supported by hangers 30 depending from a shaft 31, said hangers at their lower ends having a pivotal connection with a tray 32 the front end of which is supported by the pivotal hangers 33 which connect with said tray frame. The rear end of the tray frame terminates in an outwardly projecting scale beam 34 having a counterweight 35 mounted thereon. The front end of said tray is provided with a rocking section 36 provided with stub shafts 37 which project through the sides of said tray. One of said stub shafts carries a crank arm 38 provided with an angular extension 39 which is held in the path of movement of the tripping lever 25 so that when said tripping lever moves in one direction it will contact with said crank arm 38 and thereby rock the section 36 to an open position.

Side guides 40 are carried by the frame for guiding the tray 32 and its frame 29 in their vertical movements. A top stop 41 depending from the cross member 8 of the main frame limits the upward movement of said tray and frame, and a transversely extending crossing member 42 carried by said main frame limits their downward movement.

The chute is arranged directly above the hopper 5, and the tray is arranged just below the discharge outlet of said hopper, so that when material falls through said chute it will pass through the hopper and onto said tray. The chute is arranged at an incline which may be varied by means of the adjusting straps which connect the same with the rear standards.

The operation of the improved separator is as follows:—An egg is broken by contact with the ridge 14 of the chute frame, and the contents of the same falls onto the spaced apart rods of the chute. If the yolk is unbroken, it will slide down said chute and enter the discharge nozzle and fall onto the counterweighted spoon and from said spoon be delivered into a suitable receptacle. The white of the egg will fall through said chute and hopper and onto the tray. While the spoon at the discharge end of the nozzle is rocking on its shaft to discharge the yolk received from the nozzle, the tripping lever 25 will be brought into contact with the crank arm 37 to cause the rocking section of the tray to swing to an open position and permit the white of the egg to fall into a suitable receptacle. Should the egg which has been broken on the chute frame be a bad one or a defective one, such as one having the yolk broken, it will be seen that both the yolk and the white will fall through the chute and hopper and onto the tray, and as the counterweight for said tray has been previously arranged so that the weight of the entire contents of an egg shell will overbalance the same, the tray and its frame will rock on their pivotal hangers, and cause the egg to slide over the end of the rocking section and discharge into a receptacle arranged for bad or defective eggs. While performing this function of the invention, it will be understood that the tripping lever 25 is stationary and retained at the lower portion of its guiding cam slot, and hence out of the path of movement of the crank arm of the rocking section of the tray, therefore said rocking section will be retained in a relatively immovable position with its tray.

From the foregoing it will be seen that the present invention provides for a quick and effective separation of the whites of eggs from the yolks, and through the medium of the stripper wires which extend transversely of the chute, the yolk will be prevented from adhering to the whites. A prominent and distinctive feature of the invention is in the matter of delivering the separated yolks and whites to separate receptacles through the use of the counterweighted trays and the counterweighted spoon which automatically actuates the rocking section of said tray. And also the manner in which the bad eggs are prevented from being mixed with the good eggs.

In Fig. 7 a preferred embodiment of stop for limiting the upward movement of the tray and tray frame has been shown, the same being provided with an angular flat hook 43 which engages with the member 8 of the main frame, the lower or free end of said stop being provided with a flat angular extension 44 with which said tray and frame contacts on the upward movement.

What we claim as our invention is:—

1. An egg separating apparatus comprising a main frame, a separating chute carried thereby, a discharge nozzle carried by said chute for conveying the yolks, a rocking tray receiving the whites from said chute, and a tilting section carried by said tray which is rocked to an open position when the whites and yolks of an egg fall thereon.

2. An egg separating apparatus comprising a main frame, a screening chute carried thereby for separating the yolks from the whites, a tray receiving the whites from said chute, and a tiltable section carried by said tray which is rocked to an open position when the whites and yolks of an egg fall thereon.

3. An egg separating apparatus comprising a chute for separating the whites from the yolks and delivering the same separately, a tray receiving the whites from said chute, and means carried by said tray for permitting the escape therefrom of both the yolks and whites should the same be delivered thereon.

4. An egg separating apparatus comprising a separating chute, a nozzle carried thereby, a tray in communication with said chute, and a tiltable section carried by said tray.

5. An egg separating apparatus comprising a chute for separating the whites from the yolks but adapted to permit the escape of the entire contents of a defective egg, and a counterweighted tray receiving the whites from said separating chute and adapted to be automatically actuated to permit a defective egg to escape therefrom.

6. An egg separating apparatus comprising a separating chute for the yolks and whites, a discharge outlet for the yolks, a counterweighted tray receiving the whites from said chute and adapted to tilt to discharge the same, and a rocking section carried by said tray for discharging defective eggs.

7. A device of the character described comprising an adjustable separating chute, a discharge outlet therefor, and a tray in communication therewith.

8. A device of the character described comprising a main frame, a separating chute having one end adjustably connected thereto, and a pivotally mounted tray carried by said frame and in communication with said chute.

9. A device of the character described comprising a main frame, a chute having one end adjustably mounted thereon, a discharge nozzle carried by the other end of said chute, an automatically operated delivery spoon controlling the outlet of said discharge nozzle, and a tray carried by said frame and which is operated by said spoon.

10. A device of the character described comprising a main frame, a chute frame adjustably mounted thereon, a chute carried by said frame and composed of longitudinally extending spaced-apart rods and intersecting transversely arranged stripper wires, a discharge outlet for said chute for conveying the yolks of eggs, and a tray carried by said frame for receiving the whites of eggs.

11. A device of the character described comprising a main frame, a chute carried thereby for conveying yolks of eggs but permitting the whites thereof to pass through the chute, and a tiltable tray carried by said frame and receiving the whites from said chute.

12. A device of the character described comprising a main frame, means carried thereby for separating the whites from the yolks, a tray pivotally mounted in said frame and receiving the whites of eggs, and a tilting section carried by said tray and adapted to be rocked to an open position to permit defective eggs to escape therefrom.

13. A device of the character described comprising a separator for the whites and yolks of eggs, a tray to which the whites are delivered, and means carried by said tray for automatically discharging defective eggs therefrom.

14. A device of the character described comprising a separating chute provided with means for delivering the yolks of eggs from one end thereof and permitting the whites to escape through the same, a counterweighted tray receiving the whites from said chute, and a tilting section carried by said tray for automatically discharging defective eggs therefrom.

15. A device of the character described comprising a main frame, a chute having an adjustable connection therewith, a discharge nozzle carried by said chute, a tray pivotally mounted within said frame and adapted to be automatically actuated to deliver its contents, and a tilting section carried by said tray for discharging defective eggs therefrom.

16. A device of the character described comprising a main frame, a separating chute carried thereby, a pivotally mounted spoon controlling the discharge of said chute, a rocking tray carried by said frame, an arm carried by said spoon for raising said tray when said spoon is lowered, and an independently actuated tilting section carried by said tray.

17. A device of the character described comprising a main frame, a separator carried thereby, a spoon having a pivotal connection with said frame and controlling the discharge from the oulet of said separator, a tripping lever carried by said spoon, a tray pivotally mounted in said frame and provided with a tilting section, and a crank arm carried by said tilting section which is normally in the path of movement of said tripping lever whereby the tilting section is rocked to an open position when the tripping lever moves upwardly.

18. A device of the character described comprising a separator, a spoon controlling the discharge outlet thereof and provided with a tripping lever, a tray in communication with said separator, and a tilting section carried by said tray which is automatically rocked to an open position by said tripping lever.

19. A device of the character described comprising a separator, a spoon provided with a counterweight and adapted to receive and deliver the contents discharged from said separator, a counterweighted tray in communication with said separator, and a rocking section carried by said tray and adapted to be operated by said spoon.

20. A device of the character described comprising a main frame, a separating chute carried thereby, a hopper below said chute, a tray in communication with said hopper, and a tilting section carried by said tray.

21. A device of the character described comprising a main frame, an adjustable separating chute carried thereby, a hopper carried by said frame below said chute, a rocking tray in communication with said hopper, and a tilting section carried by said tray.

22. A device of the character described comprising a main frame, a separating chute adjustably mounted thereon and provided with a discharge nozzle, a hopper below said chute and receiving material which falls through said chute, a counterweighted rocking tray receiving material from said hopper and automatically discharging the same, and a tilting section carried by said tray and adapted to be operated by the discharge from said nozzle.

23. A device of the character described comprising a separator, a tripping lever operated by the discharge from said separator, a guide plate for said tripping lever provided with a cam slot, and a tray provided with a tilting section which is operated by said tripping lever.

24. A device of the character described comprising a separator, a spoon controlling the discharge outlet thereof, a tripping lever having a hinge connection with said spoon, a plate provided with a cam slot forming a guide for said tripping lever and adapted to move the same inwardly on its upstroke and outwardly on its downstroke, a tray in communication with said separator, and a tilting section carried by said tray and provided with a crank arm which is in the path of movement of said tripping lever when the latter is moving upwardly, whereby said tilting section is rocked to an open position.

25. A device of the character described comprising a separator, a rocking tray in communication therewith and receiving material which escapes through the same, a tilting section carried by said tray, and means controlled by the discharge from the outlet of said separator for rocking said tilting section to an open position.

26. A device of the character described comprising a main frame, a separator carried thereby, a tray pivotally mounted in said frame, a stop carried by said frame for limiting the movement of said tray in an upward direction, and a second stop carried by said frame for limiting the downward movement of said tray.

In testimony whereof we hereunto affix our signatures in presence of two witnesses.

PATRICK A. BAYLESS.
CHARLES F. REDMAN.

Witnesses:
J. A. BRANIFF,
C. L. BUNDY.